Nov. 3, 1953  H. L. MULLER ET AL  2,657,527
HOT-GAS ENGINE FUEL CONTROL
Filed Dec. 30, 1949  3 Sheets-Sheet 2

HENDRIK L. MULLER
WICHER K. BOUWMAN
*INVENTORS*

BY

AGENT

Nov. 3, 1953

H. L. MULLER ET AL 2,657,527

HOT-GAS ENGINE FUEL CONTROL

Filed Dec. 30, 1949

HENDRIK L. MULLER
WICHER K. BOUWMAN
*INVENTORS*

BY *[signature]*

AGENT

Patented Nov. 3, 1953

2,657,527

UNITED STATES PATENT OFFICE 2,657,527

HOT-GAS ENGINE FUEL CONTROL

Hendrik L. Muller, Eindhoven, Netherlands, and Wicher K. Bouwman, Harmon-on-Hudson, N. Y., assignors to Philips Laboratories, Inc., Irvington-on-Hudson, N. Y.

Application December 30, 1949, Serial No. 135,886

12 Claims. (Cl. 60—24)

This invention relates to means and methods for automatically regulating the fuel delivery to the burner of a hot-gas engine during varying load conditions.

Previous systems and devices for regulating the fuel consumption of hot-gas engines during all running conditions were unsatisfactory because they did not coordinate or correlate this fuel consumption with the means for engine power control when such control is based on the principle of regulating the amount and/or the pressure of the working medium used in the engine during its cycles of operation. Such regulation is accomplished in practice through the use of an auxiliary or augmenting working medium source, which may be a pressurized reservoir or chamber. If the auxiliary working medium is taken from a pressurized source which in turn may have its pressure varied by means of a governor controlled fluid compressor coupled to the crankshaft of the engine, the resultant pressure may be used to act on a bellows which adjusts the delivery of a fuel pump.

It has already been pointed out in our copending U. S. patent application Ser. No. 3,398, filed January 21, 1948, now U. S. Patent Number 2,558,495, that when the amount of thermal medium involved in a hot-gas engine cycle is changed from time to time by varying the timing of an engine inlet valve to a working cylinder or cylinders, so that the valve opening may change from the moment of minimum engine pressure to a moment of some higher pressure, the engine power can be regulated with the use of a reservoir of working medium at constant pressure. However, in such case it is not possible to regulate the fuel delivery to the burner of the hot-gas engine without using some method and apparatus for deriving a mean non-pulsating pressure from the varying and cyclic engine pressure source as part of the pump adjustment means.

In accordance with this invention the fuel in the delivery system may be propelled or pumped to the ultimate point of consumption, the burner, by either an engine coupled gear pump or diaphragm pump depending on the details of the system. Several possibilities present themselves with the former pump selection. The gear pumping system per se may include a by-pass valve actuated by a bellows or diaphragm, the inside or moving pressure of which may be derived from either a hydraulic governor or the mean pressure of an engine cycle or from the fuel pressure itself, taken from a point just behind the pump; the delivery of the pump being much in excess of any requirement of the burner during all operative conditions. Thus, it can be realized that any leakage of the pump itself will then have very little influence on the actual fluid flow to the burner as a movement of the by-pass towards closing will compensate for such leakage. This is a very important consideration because it is known that temperature changes, which may be considerable in the operation of a hot-gas engine, influence this leakage very much.

In another phase of the present concept of fuel control for hot-gas engines, the fuel pressure behind the gear pump or at any convenient location is used as a sort of hydraulic governor to control pressure input regulating valves in a compressor-pressurized chamber or source, the chamber having a diaphragm or similar means coupled to the by-pass valve mentioned above. The gear pump pressure may also be used as the motivation means for the variable timing of the cylinder inlet valve mentioned previously used in conjunction with pure power control of the engine. In that event, the above chamber diaphragm may be moved directly by the intermediary of the gear pump pressure to produce a reverse motion of the by-pass valve thereby opening the same.

All the above fuel systems and their variations involve a comparatively great number of moving parts having a certain amount of restrictive inertia and for that and other known reasons would not be as practical as a system employing a diaphragm pump directly motivated by varying engine pressures to feed fuel from an open source to a burner through a known evaporator. Therefore, another major phase of the present concept of engine fuel control contemplates the use of a supplementary-spring loaded diaphragm pump or pumps directly connected on one side of the diaphragm to the interior of the engine by any convenient confining means, the inlet to the pump connected to an open fuel tank, and the outlet of the pump leading to a conventional burner. In this system the fuel delivery of the diaphragm pump is automatically proportional to the engine speed and the load thereon. This is because the frequency of the diaphragm pulsation is proportional to the frequency of the pressure variation in the cylinder which, of course, is directly correlated with the speed of engine while the length of stroke of the diaphragm is proportional to the pressure variation value within the egine which in turn is dependent on the load applied, its speed and/or load. An adjustable valve may be put in the air or engine-medium connection to the pump for the purpose of permitting manual fuel adjustment when desirable.

In consideration of the foregoing, it will be seen that one important object of this invention is to provide a highly flexible fuel delivery system for a hot-gas engine.

A further prime object of this invention is to provide a fuel delivery system properly coordinated and harmonized with a power control system of a hot-gas engine.

Another object of this invention is to provide means for controlling the effective fuel delivery to the burner of a hot-gas engine by utilizing the pressure changes in the engine which fluctuate according to loads imposed on the engine.

Another object of this invention is to control in a positive manner the output of a fluid pressure generator to a pressure reservoir of a hot-gas engine as by utilization of the pressure of fuel pumped to the burner for said hot-gas engine; the effective delivery of the fuel to the burner in turn being controlled in part by the pressure in the pressure reservoir.

Still another object of this invention is to provide a pumping arrangement for delivering fuel to the burner of a hot-gas engine in a positively controlled manner by direct utilization of the speed of the engine as well as the pressure fluctuations in the engine cylinder.

Another object of this invention is to control the effective delivery of the fuel pumped to the burner of a hot-gas engine by controlling the delivery of air from an engine driven compressor to a pressure reservoir which is connected intermittently into the cylinder of the engine. The air delivery control to the reservoir is effected by the fuel pump delivery pressure, and the pressure in the reservoir, in turn, is utilized to finally determine the effective fuel delivery.

Other objects and advantages of the invention will be apparent from the following description, the accompanying drawings, and the appended claims.

In the drawing:

Fig. 2a is an enlarged detail view of the crank-shaft cam operated valve showing the relationship thereof to the housing (shown in dotted lines) in which it is mounted.

Figure 1:
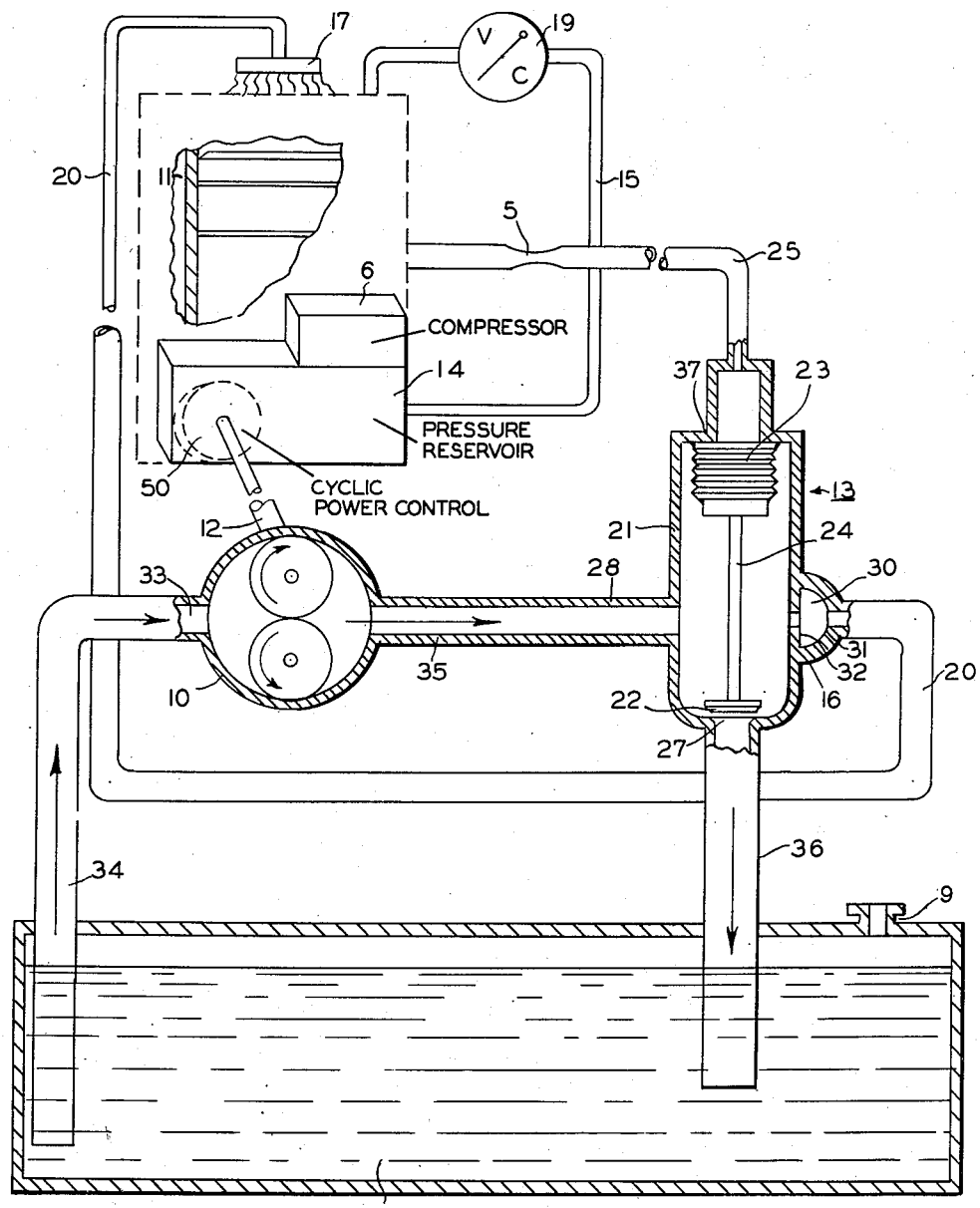
Fig. 1 is a diagrammatic representation of one embodiment of the invention with the pump and control valve assembly shown in section and a part of the hot-gas engine broken away to indicate the internal structure thereof.

Referring to Fig. 1 it is seen that one embodiment of a self-regulating automatic fuel system for a hot-gas engine according to this invention comprises an engine driven or coupled gear pump 10, by-pass valve means 13 coupled to the outlet of this pump, a fuel source 18 which may be either an open tank or one substantially vented as shown at 9 because of the nature of the fuel system, and a pressure reservoir 14 to which is connected a compressor 6 by which the pressure in 14 may be built up as indicated in the aforesaid U. S. Patent Number 2,558,495. Further, as shown in the aforesaid application, a cyclic power control unit shown diagrammatically at 50 in dotted lines is housed inside the pressure reservoir 14. In addition to these major components the system may require restriction means 16 connected to the fuel outlet side of the by-pass valve means 13. The by-pass valve means 13 consists of a main body member 21 inside of which a valve 22 coupled to a sealably retained bellows or diaphragm means 23 through a valve stem 24 is movable in accordance with mean engine pressure changes since bellows 23 is connected through piping 25 and a restriction 5 to the interior of the engine 11 itself which in the present illustration is shown coupled to the pressure source 14 through a working medium duct 15 as well as via the cyclic power control according to the aforesaid U. S. Patent Number 2,558,495. It is to be understood that the internal structure of the engine 11 as indicated in Fig. 1, is of more or less conventional design as more particularly exemplified within the dotted line square in Fig. 3 of the drawings wherein the known engine parts are designated by suitable legends. In the working medium duct 15 is a conventional check valve 19 arranged to prevent loss of pressure from the engine 11 back to the pressure reservoir 14. The main body member 21 of element 13 has an opening 37 at the top for sealably holding bellows 23 in its proper position, while the right and left lower sides contain fuel inlet means 28 and outlet means 30, respectively. The bottom of this member 21 is formed as an excess fuel outlet 27 containing a valve seat for the valve 22. At the outlet 30 there may be found a restriction means 16 comprising a bell shaped element 31 conveniently attached to a pipe line 20 leading to a burner 17 located in heating relationship with the engine 11 in conventional manner as shown diagrammatically. A punctured disc-shaped orifice element 32 is conveniently interposed between the bell shaped element 31 and a side wall of the body member 21 in the by-pass valve means 13. An inlet 33 of the fuel pump 10 is connected to the fuel source or tank 18 through a duct 34 while an outlet 35 of this pump is connected to the inlet 28 of the by-pass valve means 13. Excess fuel is shunted or by-passed back into the tank 18 through the fuel outlet 27 and through a duct 36 connected thereto and to the tank 18. Since the fuel pump 10 is coupled to the hot-gas engine 11 through any known coupling 12 which may be the engine shaft and the pump is a rotary gear pump. The fuel pumping system is designed to pump fuel always in excess of any burner demand dependent on the said engine load conditions. Since the operation of this described fuel system is similar to another one presently to be described, it is deemed better to demonstrate the operation of both fuel systems after the latter description.

Figure 2:
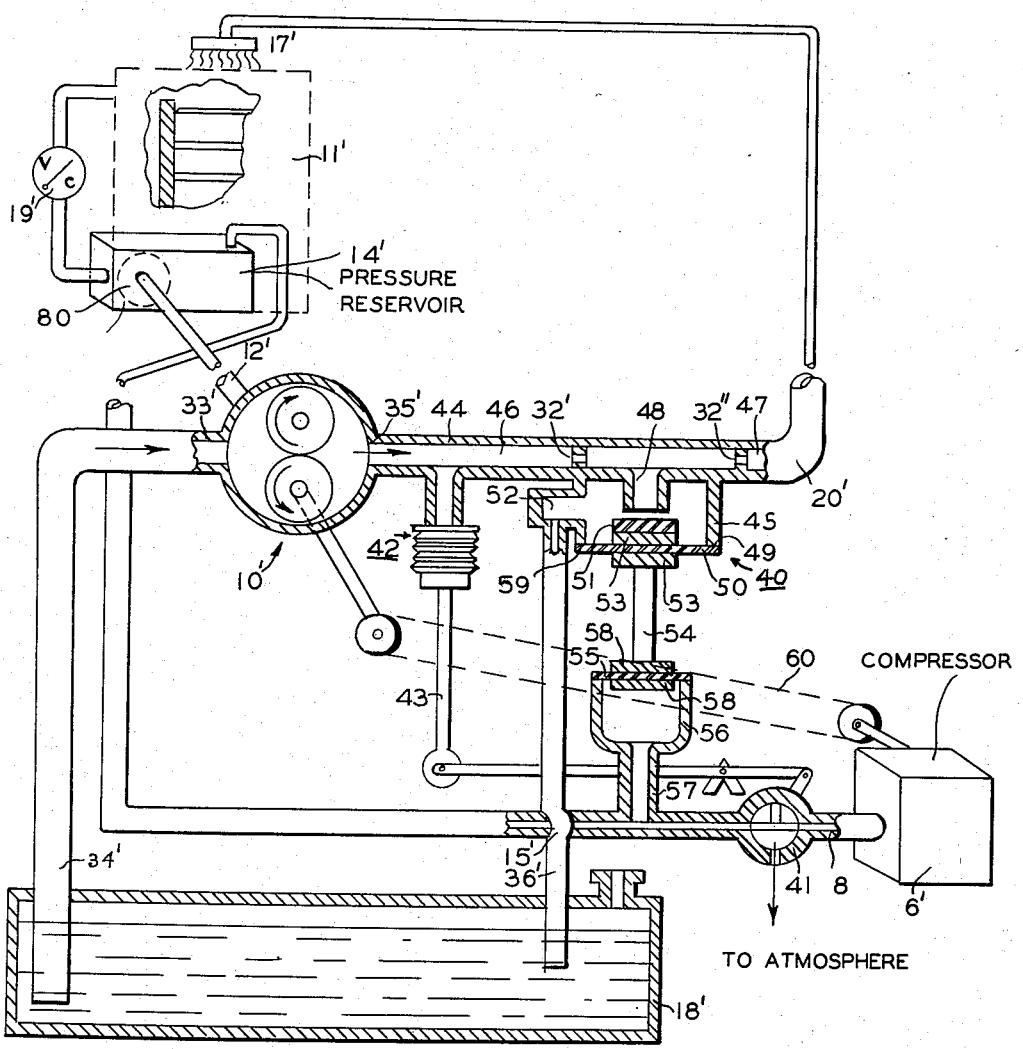
Fig. 2 is a diagrammatic representation of another embodiment of the invention with the pump and control valve assembly shown in section and a part of the hot-gas engine broken away to indicate the internal structure thereof.
Figure 2:
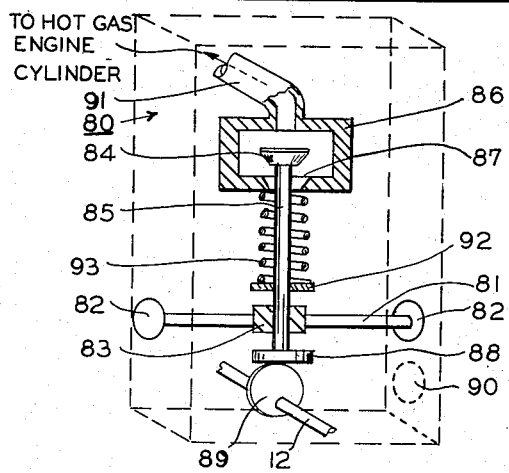

In Fig. 2 the fuel delivery system is shown with some parts similar to the ones in Fig. 1 and are given primed numbers for easy identification. Again the delivery system is characterized by a gear pump pumping system including by-pass valve means 40 differently designed than the one 13 shown in Fig. 1 but is motivated more directly from the pressure in reservoir 14' through another type of diaphragm control which is also subject to fuel pressure. However, in the present case the pressure of reservoir 14' is additionally conditioned by the position of a valve 41 in a duct 8 from a compressor 6'. The compressor 6', in this case, is displaced from the pressure reservoir 14' which it supplies so that the valve 41, as well as the conduit 57 referred to hereinafter, may be interposed therebetween. As shown in dotted lines 60, the compressor 6' may be linked to the extension of shaft 12' beyond the gear pump as by a chain drive for example, or any other suitable mechanical linkage. The position of valve 41 is determined by the pressure within bellows 42 which is coupled to the pump outlet 35'. The bellows 42 is connected to the valve 41 through any convenient linkage 43. The by-pass valve means 40 is composed of a main body member 45 having a left main inlet means 46 and a right main outlet means 47, the latter being coupled to the burner 17' through duct 20' while the former is connected to a T member 44 in turn connected to the pump outlet 35'. Bellows 42 is connected to this T member. The main member 45 is further designed to have an interior shunt or by-pass valve opening or seat 48 interposed in a shunting manner between the mentioned main inlet means 46 and outlet means 47. The seat 48 leads to a cavity formed by a diaphragm seating means 49 to which a flexible diaphragm 50 is sealably attached by known clamping means shown at 59. A valve element 51 which may be of rubber is attached to a valve stem 54 through the intermediary of metallic blocks 53 sweated or bonded to a centralized area of the diaphragm 50, and is moved intermittently to and from the valve seat 48 by the action of another diaphragm 55 motivated by pressure changes within the pressure source 14'. The diaphragm 55 is attached to a bell shaped member 56 which is coupled to the pressure source 14' through a duct 57. Also, the diaphragm 55 is similarly connected to the lower end of stem 54 by blocks 58 as it is at the top of the stem. An effective outlet 52 for the valve seat 48 is integral with the diaphragm seating means 49 and is coupled to the return duct 36'. The hot-gas engine 11' may again be of conventional design as indicated in Fig. 2 and more clearly illustrated in Fig. 3 of the drawings.

The embodiment illustrated in Fig. 2 differs from that shown in Fig. 1 in another important structural feature, however. Instead of the cyclic power control 50 of the latter embodiment, a simple intermittent pressure communication device 80 between the pressure reservoir 14' and the hot-gas engine interior is utilized, the general location of which is shown in Fig. 2. The details of device 80 are shown in Fig. 2a, and comprise a valve support 81 anchored at the ends thereof to the walls of the device 80 shown in dotted line therein. Support 81 carries a valve guide 83 in which valve element 85 rides. Valve element 85 comprises a valve head 84 at one end which cooperates with valve seat 87 carried by the conduit enlargement 86 coupled to one end of conduit 91. The other end of conduit 91 connects into the interior of the hot-gas engine 11' as indicated by the legend in Fig. 2a. Pressure in reservoir 14' is communicated to the interior of device 80 via an aperture 90. The other end of valve 85 carries an engaging disc 88 which rides on cam 89 mounted on shaft 12' for rotation therewith.

A spring 93 is pressed between the under side of enlargement 86 and a disc 92 fixed on the valve element 85 for urging the valve to closed position when the cam 89 permits such action. The cam is arranged on shaft 12' in such position that the high position thereof causes the valve to open, as shown in Fig. 2a, when minimum pressure obtains in the engine as caused by the relative position of the working elements in the cylinder during the normal cycle of operations therein.

The operation of the described embodiments of this invention is as follows:

In Fig. 1 a hot-gas engine 11 is assumed to be intermittently loaded and, therefore, it will have varying speeds corresponding to the load changes. Hence, it is highly desirable to provide a self-regulating automatic fuel system which will properly supply fuel to the prime heat source or burner 17 for this engine. A pump 10 coupled to engine 11 through coupling 12 pumps fuel from the tank 18 to the pump outlet 35 at a rate dependent upon the speed of the engine 11. Therefore, if the burner 17 had been directly connected to the outlet 35, a decrease of engine speed would have caused a decreased fuel flow to the burner. Hence, increasing engine demands typified by inverse engine speeds could not be cared for fully even though the power control shown in the aforesaid U. S. Patent Number 2,558,495 by the present inventors is used. The more adequate control is therefore achieved by the already discussed novel arrangement. Thus the present pressure source 14 is used in addition to the usual function as a pressure source to make up leakage losses as via conduit 15 and check valve 19, but also as the so-called augmenting or auxiliary pressure source through the cyclic power control 50 shown in dotted line diagram form since it is already shown in the mentioned patent application, Figs. 3 and 5. Further, the rotary pump 10 is selected on the basis of fuel delivery beyond any burner feed necessary for any engine speed and load, but to effect such an arrangement it is necessary to have a considerable by-pass flow from the pump back to the fuel reservoir. Therefore, a by-pass valve arrangement 13 is interposed between the pump 10 and the burner 17. When the speed of the engine 11 is at a certain value due to a definite loading, a certain engine pressure is found within the working cylinder of this engine. This pressure carried over through the pressure averaging nozzle 5 operates a bellows 23 pneumatically connected interiorly to the engine 11 by the duct 25. The valve 22 and its stem 24 connected to bellows 23 will be moved into a predetermined position for the proper shunting or by-passing of fuel intended for the burner 17 and thus this burner will receive the proper amount of fuel for consumption. Referring to the mentioned patent application it is recognized that the above condition through a governor controlled cam operated valve arrangement shown therein, and labeled a cyclic power control herein, causes a pneumatic coupling on a cyclic basis of the pressure source 14 with the engine 11, or more specifically, its working cylinder. Now, if the load on the engine increases, the speed of the engine will decrease, and the internal pressure of the engine will have to increase to balance this load. The cyclic power control 50 will so operate as described in said patent application that an increased volume of augmenting engine medium is given to the successively repeated engine operating cycles and at their most advantageous points. The increased average engine pressure will again, through the mechanism described, move valve 22 down into a more closed or less shunting or by-passing position, and hence more of the fuel pumped through the by-pass means 13 reaches the burner and at a rate which builds up faster than that caused by a decrease of the pump speed determined by the engine load. Since the fuel source 18 is substantially an open type tank, pump 10 cannot lose its siphon action. A restriction 16 including a disc 32 is inserted in fuel line 20 to provide additional frictional fuel flow regulation as by a suitable dimension of the diameter of the aperture in said disc 32.

The operation of the Fig. 2 system of fuel control for a hot-gas engine is in many respects similar to that for Fig. 1. The pressure within the pressure reservoir 14' is now determined by two factors, the mean engine pressure and the pump pressure, the latter functioning through the bellows 42 which is coupled to a three way valve 41 in the pressure line or duct 8. The valve 41 is connected in the duct 8 between the compressor 6' and the pressure reservoir or tank 14'. A by-pass valve arrangement 40 is interposed between the pump 10' and the burner 17 and functions in a manner similar to that for valve arrangement 13 in Fig. 1, the pressure responsive means for both being different in design only. Two apertured plates 32', 32" are press fitted into the main fuel stream of the main body member 45 to produce additional hydraulic control of the fuel flow as it enters the by-pass valve means 40 and leaves for the burner.

Again it should be recognized that the above fuel control would not be sufficient to keep the hot-gas engine in the proper operating condition for all loads placed thereon. Accordingly, the intermittent connection of the engine cylinder 11' with the reservoir 14' via valve device 80, as explained hereinbefore, assures that the effective fuel delivery is dependent upon fluid pressure variations in the cylinder 11' which in turn are dependent upon the load on the engine. Such fluid pressure variations, however, may be augmented by the fluid pressure supplied by the compressor 6'. Augmentation of fluid pressures occurs at the time of increased fuel pressure at the delivery end of the pump. The fluid pressure augmentation acts directly on the fuel by-pass valve 51 via diaphragm 58 so that a greater effective fuel delivery is accomplished at the time larger fluid pressures obtain in the system so that the power output is greatly enhanced under such conditions.

Figure 3:
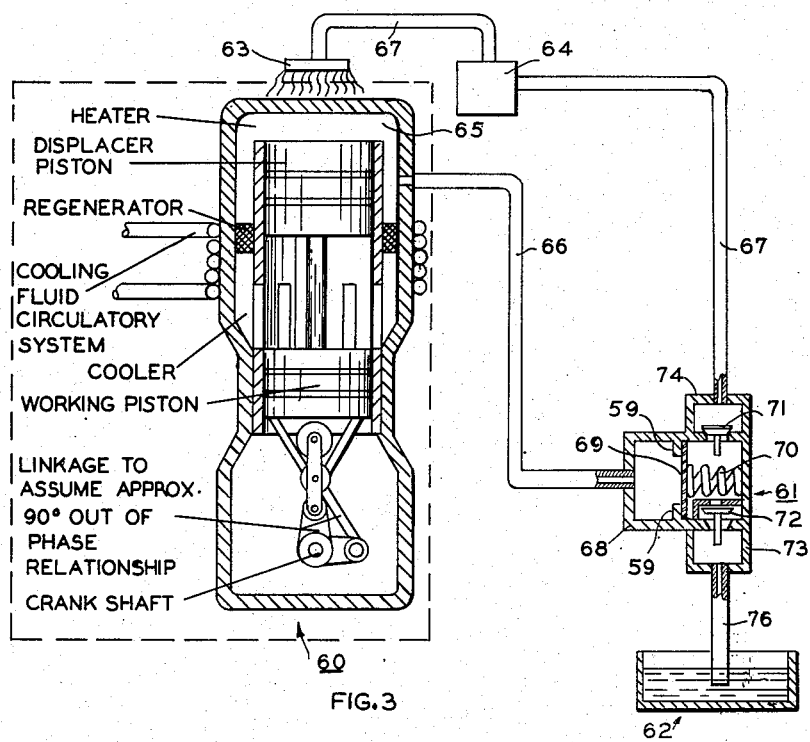
Fig. 3 is a vertical section of a hot-gas engine in which is schematically shown the pistons and crank-shaft connections thereon and to which another fuel control system schematically shown is connected.

In Fig. 3 a simplified form of self-regulating automatic fuel delivery system is produced by connecting a diaphragm pump 61 to the cylinder chamber 65 of a hot-gas engine 60 through a duct 66, and feeding fuel pumped from reservoir 62 to a burner 63 via inlet duct 76 and outlet duct 67. A conventional evaporator 64 may be inserted at any convenient point within the duct 67. The details of the engine 60 while shown in the drawing are not described because they are not pertinent to this invention. It is deemed sufficient that the main elements of the hot-gas engine, shown only by way of example, are designated by suitable legends. The construction of the pump 61 comprises a main body member 68 having an engine medium inlet connected to the duct 66, a number of protrusions 59 within the body 68 for the reception of diaphragm member 69 attached to these protrusions by any conventional means, not shown, such as riveting or spot welding. A spring 70 is interposed between the diaphragm 69 and the right-hand interior body portion of the pump 61 within the fuel flow section of the pump. The pump 61 is additionally characterized by the usual valve chambers 73 and 74 within which are found the conventional valves 72 and 71, respectively. Valve 72 is called the inlet or suction valve and is connected to the reservoir at 62 by a duct 76, the outlet valve 71 is connected to the evaporator 64 by the duct 67. The operation of this system is as follows:

As the pressure within the engine 60 changes cyclically in the usual manner upon operating this engine the diaphragm 69 is moved in accordance with the pressure changes within the selected chamber 65 and, hence, as is well-known in the pumping art the fuel in the reservoir 62 will be pumped therefrom to the burner 63. Thus, it can be readily seen that since the amplitude and frequency of the stroke of the diaphragm 69 is in direct proportion to the pressure changes within the engine, and frequency of such changes, i. e. speed of the engine, any load change demand on the engine will reflect itself upon the diaphragm 69. Therefore, the prime heat source, the burner 63 will be immediately responsive to any such engine demand.

Figure 4:
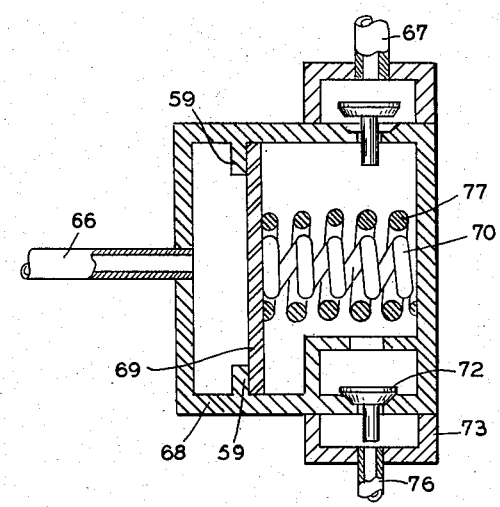
Fig. 4 is an enlarged detail view of a pump similar to that shown in Fig. 3 but modified by the presence of another spring surrounding the first for reasons set forth hereinafter.

The purpose of the spring 70 is to compensate for the fluctuating gas force on the other side of the membrane and so to allow the membrane a displacement towards the right, as viewed in Fig. 4, depending on the immediate pressure on the other side. As at low loads of the engine the delivery of the pump must be relatively higher than at higher loads, spring 70 is the spring that acts at low loads. A spring 71 shown in Fig. 4 anchored to the right end portion of member 68 and separated from the diaphragm 69 a distance in order that this spring 71 will act at higher loads of the engine. Thus, it can be seen that spring 71 acts as a buffer and diaphragm centralizing means for engine loads above a certain high value whereby the fuel consumption will not be of the form $\phi = cp$ but approximately $$\phi = cp + A$$

$\phi$ being fuel consumption
$c$ a constant
$p$ the speed pressure
$A$ a constant due to heat loss by radiation and convection.

While the applicants have shown and described three particular embodiments of the present invention, they do not wish to be limited by any of the precepts demonstrated within the subject disclosure except as defined by the claims appended herebelow.

We claim:

1. In a hot-gas engine, a self-regulating fuel delivery system comprising a fuel source, a burner system having the burner thereof located in heat exchange relationship with said engine, means operatively associated with said engine for causing fluid pressure variations, a pumping system connecting said source to said burner, and means responsive to said fluid pressure variations for varying the effective delivery of said pumping system to said burner.

2. In a hot-gas engine having a crank-shaft, a self-regulating fuel delivery system comprising a fuel source, a burner system having the burner thereof located in heat exchange relationship with said engine, means mechanically linked with said crank-shaft for causing fluid pressure variations, a pumping system connecting said source to said burner, and means responsive to said fluid pressure variations for varying the effective delivery of said pumping system to said burner.

3. In a hot-gas engine, a self-regulating fuel delivery system comprising engine working cylinder means and a fuel source, a burner system having the burner thereof located in heat exchange relationship with said cylinder means, and a pumping system connecting said source to said burner, and means responsive to pressure changes in said cylinder means for varying the effective delivery of said pumping system to said burner system.

4. In a hot-gas engine, a self-regulating fuel delivery system comprising a fuel source, a burner system, a pumping system for forcing fuel from said fuel source to said burner system, said pumping system including a valve controlled by-pass return means leading back to said fuel source, and means subjected to a pressure generated by said engine for actuating said valve.

5. In a hot-gas engine, a self-regulating fuel delivery system comprising a fuel source, a burner in heat exchange relationship with said hot-gas engine, a pump having an inlet connected to said fuel source and an outlet connected to said burner, means mechanically coupling said pump to said engine for operation thereby, by-pass return means connecting said pump outlet back to said fuel source, valve means controlling said by-pass return means, and means responsive to engine pressure changes for actuating said valve means.

6. In a hot-gas engine, a self-regulating fuel delivery system comprising a vented fuel tank, a fluid pressure source, conduit means for connecting said fuel pressure source to said engine, an engine driven pump with an inlet and outlet, means connecting said pump inlet to said fuel tank, a by-pass valve unit connected into said pump outlet, duct means connecting said valve unit back to said tank, a valve element controlling flow through said duct means, a burner, means connecting said valve unit to said burner, said means having a fluid restriction device therein, and means responsive to the pressure in said pressure source for actuating said valve element, said burner being located adjacent said hot-gas engine in heat exchange relationship therewith, said pump being dimensioned to produce an automatic fuel flow always in excess of any burner demand.

7. In a hot-gas engine, a self-regulating fuel delivery system comprising a fuel tank, an engine driven fuel pump including inlet means and outlet means, said inlet means being connected to said tank, a burner located adjacent said hot-gas engine in heat exchange relationship therewith, a first conduit means connecting said pump outlet means with said burner, restriction means interposed in said conduit means, second conduit means connecting into said first conduit means between said pump outlet means and said restriction means, said second conduit means having outlet means in said tank, valve means for controlling fuel flow through said second conduit means, differential pressure responsive means for actuating said valve means, a first part of said pressure responsive means being exposed to the fuel pressure obtaining in said first conduit between said pump outlet and said restriction means, an engine pressurized fluid pressure source, third conduit means connecting said fluid pressure source to another part of said pressure responsive means in opposition to said first part.

8. In a hot-gas engine having a crank-shaft and a working medium cylinder, a self-regulating fuel delivery system comprising a fuel source, a burner system having the burner thereof located in heat exchange relationship with said cylinder, a pressure reservoir, means for supplying fluid pressure to said reservoir, check-valve controlled passageway means connecting said cylinder to said reservoir for permitting fluid pressure flow only in the direction from said reservoir to said cylinder, pumping means driven by crank-shaft for pumping fuel from said source through conduit means to said burner, by-pass return means connected into said conduit means between said pumping means and said burner and opening into said fuel source, a valve for controlling flow through said by-pass return means, differential pressure responsive means for actuating said valve, said differential pressure responsive means being subjected to two opposing pressures, one of said pressures being that of the fuel in said conduit means between said pumping means and said burner, and the other of said pressures being the mean pressure obtaining in said cylinder.

9. In a hot-gas engine having a crank-shaft and a working medium cylinder, a self-regulating fuel delivery system comprising a fuel source, a burner system having the burner thereof located in heat exchange relationship with said cylinder, a pressure reservoir, means mechanically linked with said crank-shaft for supplying said reservoir with fluid pressure medium, check-valve controlled passageway means connecting said cylinder to said reservoir for permitting fluid pressure flow only in the direction from said reservoir to said cylinder, pumping means driven by said crank-shaft for pumping fuel from said source through conduit means to said burner, by-pass return means connected into said conduit means between said pumping means and said burner and opening into said fuel source, a valve for controlling flow through said by-pass return means, differential pressure responsive means for actuating said valve, said differential pressure responsive means being subjected to two opposing pressures one of said pressures being that of the fuel in said conduit means between said pumping means and said burner, and the other of said pressures being that of the fluid pressure in said reservoir, and other pressure responsive means in said last-named conduit means for controlling the delivery of said fluid pressure supplying means to said pressure reservoir.

10. In combination with the working cylinder of a hot-gas engine, a self-regulating fuel delivery system comprising a fuel source, diaphragm pump means including a variable gas chamber and a variable fuel chamber, engine-gas conducting means connecting said gas chamber and said interior of the engine cylinder, valve-controlled fuel inlet means integral with said pump means and connected to said source, valve-controlled fuel inlet means integral with said pump means and connected to said source, valve-controlled fuel outlet means positioned adjacent said fuel inlet means, a fuel burner, and conduit means between said burner and said fuel outlet means whereby fluctuations in the pressure obtaining in the working cylinder caused during normal operation and by changes in engine load demands cause said pump means to supply correspondingly varying amounts of fuel to said burner.

11. In a hot-gas engine, a self-regulating fuel delivery system comprising a fuel source, a diaphragm fuel pump including a gas confining space and a fuel space separated by a diaphragm, engine gas input means to said gas space, fuel input means to said fuel space connected from said source, a burner, and pump outlet means connected from said fuel space to said burner whereby changes in the engine pressure cause corresponding changes in the fuel flow to said burner.

12. In a hot-gas engine, a self-regulating fuel dispensing system comprising a diaphragm pump including resilient centralizing and buffer means engaging said diaphragm on one side of said engine for urging said diaphragm in one direction, a burner, means connecting said engine to said pump on the other side of said diaphragm for urging said diaphragm in the opposite direction an amount in accordance with pressure fluctuations corresponding to changes in engine power, fuel input means connected to said pump to said one side of said diaphragm, and fuel output means from said pump from said one side of said diaphragm to said burner whereby changes in pressure fluctuations corresponding to changes in engine power demands are compensated for by changes in fuel output to said burner.

HENDRIK L. MULLER.
WICHER K. BOUWMAN.

References Cited in the file of this patent

UNITED STATES PATENTS

| Number | Name | Date |
|---|---|---|
| 1,052,588 | Janicki | Feb. 11, 1913 |
| 2,214,922 | Ericson | Sept. 17, 1940 |

FOREIGN PATENTS

| Number | Country | Date |
|---|---|---|
| 606,613 | France | Mar. 12, 1926 |
| 632,401 | France | Oct. 4, 1927 |
| 634,537 | France | Nov. 19, 1927 |
| 452,900 | Germany | Nov. 22, 1927 |